US009569233B2

(12) United States Patent
Masters et al.

(10) Patent No.: US 9,569,233 B2
(45) Date of Patent: Feb. 14, 2017

(54) ELASTIC OFFLOAD OF PREBUILT TRAFFIC MANAGEMENT SYSTEM COMPONENT VIRTUAL MACHINES

(71) Applicant: F5 NETWORKS, INC., Seattle, WA (US)

(72) Inventors: Richard Roderick Masters, Seattle, WA (US); Brent Wayne Blood, Seattle, WA (US); Paul Imre Szabo, Shoreline, WA (US); Benn Sapin Bollay, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 95 days.

(21) Appl. No.: 13/830,425

(22) Filed: Mar. 14, 2013

(65) Prior Publication Data

US 2014/0189686 A1    Jul. 3, 2014

Related U.S. Application Data

(60) Provisional application No. 61/747,928, filed on Dec. 31, 2012.

(51) Int. Cl.
*G06F 9/455* (2006.01)
*G06F 9/46* (2006.01)
(Continued)

(52) U.S. Cl.
CPC ............ *G06F 9/455* (2013.01); *G06F 9/4555* (2013.01); *G06F 9/45533* (2013.01);
(Continued)

(58) Field of Classification Search
None
See application file for complete search history.

(56) References Cited

U.S. PATENT DOCUMENTS

2007/0043860 A1    2/2007   Pabari
2007/0130566 A1*   6/2007   van Rietschote et al. ........ 718/1
(Continued)

FOREIGN PATENT DOCUMENTS

KR    1020120071981 A    7/2012
WO    2008067848 A1    6/2008

OTHER PUBLICATIONS

International Search Report and Written Opinion for International Application No. PCT/US2013/078094, mailed on Apr. 16, 2014.
(Continued)

*Primary Examiner* — Charles Swift
(74) *Attorney, Agent, or Firm* — John W. Branch; Lowe Graham Jones PLLC

(57) ABSTRACT

Embodiments are directed towards employing a traffic management system (TMS) that is enabled to deploy component virtual machines (CVM) to the cloud to perform tasks of the TMS. In some embodiments, a TMS may be employed with one or more CVMs. In at least one embodiment, the TMS may maintain an image of each CVM. Each CVM may be configured to perform one or more tasks, to operate in specific cloud infrastructures, or the like. The TMS may deploy one or more CVMs locally and/or to one or more public and/or private clouds. In some embodiments, deployment of the CVMs may be based on a type of task to be performed, anticipated resource utilization, customer policies, or the like. The deployment of the CVMs may be dynamically updated based on monitored usage patterns, task completions, customer policies, or the like.

43 Claims, 9 Drawing Sheets

(51) Int. Cl.
  *G06F 15/173* (2006.01)
  *G06F 9/48* (2006.01)
  *G06F 9/50* (2006.01)
  *H04L 29/08* (2006.01)

(52) U.S. Cl.
  CPC ...... *G06F 9/45541* (2013.01); *G06F 9/45545* (2013.01); *G06F 9/45558* (2013.01); *G06F 9/48* (2013.01); *G06F 9/485* (2013.01); *G06F 9/4843* (2013.01); *G06F 9/4856* (2013.01); *G06F 9/4862* (2013.01); *G06F 9/4868* (2013.01); *G06F 9/4881* (2013.01); *G06F 9/50* (2013.01); *G06F 9/505* (2013.01); *G06F 9/5005* (2013.01); *G06F 9/5027* (2013.01); *G06F 9/5055* (2013.01); *G06F 9/5083* (2013.01); *G06F 9/5088* (2013.01); *H04L 67/10* (2013.01); *H04L 67/1008* (2013.01); *H04L 67/1031* (2013.01); *G06F 2009/4557* (2013.01); *G06F 2009/45562* (2013.01); *G06F 2009/45591* (2013.01)

(56) References Cited

U.S. PATENT DOCUMENTS

| | | | |
|---|---|---|---|
| 2009/0172799 A1* | 7/2009 | Morgan | G06F 11/2023 726/11 |
| 2009/0241190 A1 | 9/2009 | Todd | |
| 2010/0027420 A1 | 2/2010 | Smith | |
| 2010/0223364 A1 | 9/2010 | wei | |
| 2010/0269109 A1* | 10/2010 | Cartales | 718/1 |
| 2011/0055377 A1 | 3/2011 | DeHaan | |
| 2011/0055385 A1* | 3/2011 | Tung et al. | 709/224 |
| 2011/0055399 A1* | 3/2011 | Tung et al. | 709/226 |
| 2011/0131448 A1 | 6/2011 | Vasil et al. | |
| 2011/0179162 A1* | 7/2011 | Mayo et al. | 709/224 |
| 2012/0089980 A1* | 4/2012 | Sharp et al. | 718/1 |
| 2012/0144038 A1 | 6/2012 | Hildebrand | |
| 2012/0222041 A1* | 8/2012 | Sabin et al. | 718/105 |
| 2012/0246638 A1* | 9/2012 | He et al. | 718/1 |
| 2012/0303835 A1* | 11/2012 | Kempf et al. | 709/235 |
| 2013/0097601 A1* | 4/2013 | Podvratnik et al. | 718/1 |
| 2013/0232498 A1* | 9/2013 | Mangtani | G06F 9/5072 718/104 |
| 2013/0275974 A1* | 10/2013 | Cao et al. | 718/1 |
| 2014/0075013 A1* | 3/2014 | Agrawal et al. | 709/224 |

OTHER PUBLICATIONS

European Search Report for Application No. 13866832.2, mailed on Jul. 28, 2016, 9 pages.

* cited by examiner

ELASTIC OFFLOAD OF PREBUILT TRAFFIC MANAGEMENT SYSTEM COMPONENT VIRTUAL MACHINES

CROSS-REFERENCE TO RELATED APPLICATIONS

This non-provisional patent application claims the benefit at least under 35 U.S.C. §119(e) of U.S. Provisional Patent Application Ser. No. 61/747,928, filed on Dec. 31, 2012, entitled "Elastic Offload of Prebuilt Traffic Management System Component Virtual Machines," which is incorporated herein by reference.

TECHNICAL FIELD

The present invention relates generally to packet traffic management and, more particularly, but not exclusively to employing a traffic management system that is enabled to offload tasks by deploying component virtual machines.

BACKGROUND

Today, many entities utilize computing products provided by others. These entities/customers may purchase hardware and/or software systems from a vendor depending on the needs of the customer. Sometimes a vendor may tailor make a system for a customer based on the customer's needs. However, tailor making different systems for different customers may be time consuming and/or burdensome to the vendor. Other times the system may be created to utilize and/or leverage existing hardware and/or components of the customer, such as a structured query language database. However, a customer's existing hardware and/or components may not be compatible with the system, may not provide appropriate functionality, and/or may not provide an overall optimized system. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
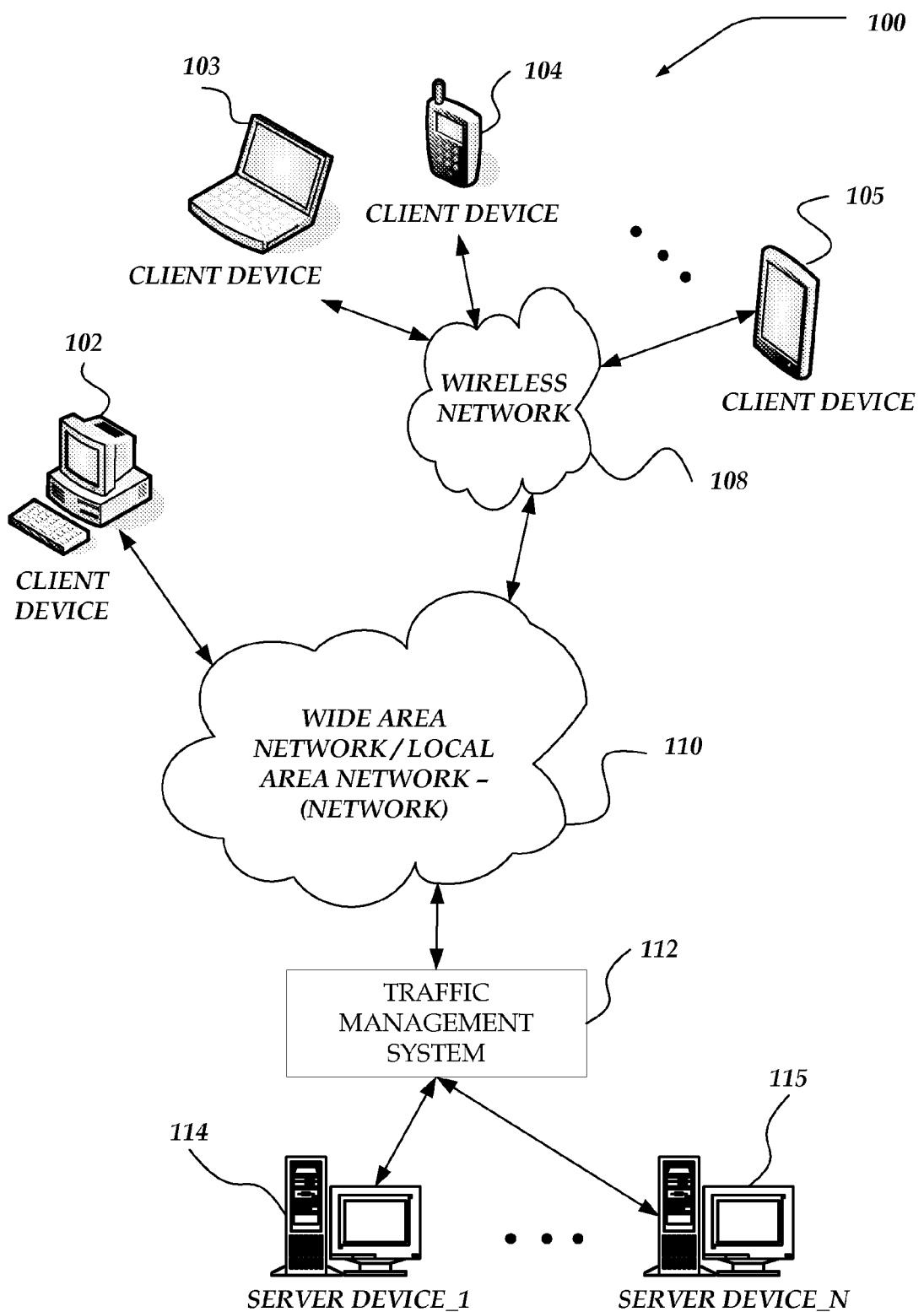
FIG. 1 illustrates a system diagram of an environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "traffic management system" or "TMS" refers to a network device capable of managing network traffic between endpoints, such as network devices. Such devices include, for example, routers, proxies, firewalls, load balancers, cache devices, devices that perform network address translation, or the like, or any combination thereof. The TMS may be configured to perform one or more tasks. A task may refer to a process for managing and/or monitoring network traffic. Tasks can be performed by the TMS itself, or the TMS may deploy one or more component virtual machines to perform one or more tasks. Examples of tasks include, but are not limited to, load balancing, server monitoring, session monitoring, log and/or event monitoring, object data management, routing, translating, switching packets, or the like, or any combination thereof.

As used herein, the term "component virtual machine" or "CVM" refers to a virtual machine that can be configured to perform at least one task of a TMS and/or at least one service that can be utilized by the TMS. In at least one embodiment, a CVM may include proprietary components that may be enabled to perform different actions and/or execute different tasks. In another embodiment, a CVM be configured to support and/or be optimized for different cloud infrastructures. For example, different CVMs may support different Cloud APIs, such as, but not limited to VMware, OpenStack, or the like.

As used herein, the phrase "usage pattern" refers to actions associated with one or more tasks performed by a CVM, the TMS, or other device. Examples of usage patterns may include, but are not limited to, task packet traffic flow, a number of maintained connections, resource utilization (e.g., memory and/or disk space, processor utilization, input/output operations, or the like), a particular task, resource utilization of a particular task, or the like. In some embodiments, usage patterns may indicate a workload of a CVM, TMS, or other device. In other embodiments, the usage pattern of a CVM or TMS may be anticipated based on a task to be performed.

As used herein, the term "workload" refers to an amount of computing resources being consumed and/or utilized by a CVM, the TMS, or other device. In at least one embodiment, workload may include a percentage utilization of a computing resource or resources. In another embodiment, workload may include a percentage of time that a device (e.g., a CVM) is down and not performing and/or employing actions. In some embodiments, the workload may indicate a performance and/or efficiency the CVM or TMS is operating (e.g., how efficiently is the CVM utilizing current resources to perform a task compared to employing a different CVM or the TMS to perform the same task with other resources).

As used herein, the phrase "cloud infrastructure" may refer to hardware and/or software computing resources that are maintained separate from the TMS. Such computing resources include, but are not limited to, processors, temporary and/or permanent memory and/or storage, input/output, or the like, or any combination thereof. In some embodiments, the cloud infrastructure may be a private cloud, public cloud, or a combination thereof. A private cloud may refer to a cloud infrastructure that has restricted access for specific devices, users, entities, or the like, or any combination thereof. A public cloud may refer to a cloud infrastructure that has unrestricted access for specific devices, users, entities, or the like, or any combination thereof.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards employing a traffic management system (TMS) that is enabled to deploy one or more component virtual machines (CVM) to the cloud to perform tasks of the TMS. In some embodiments, a TMS may be employed with one or more CVMs. In at least one embodiment, the TMS may include and/or maintain an image of each CVM. In some embodiments, the TMS may implement a user interface that enables an administrator or other user to manage configuration, deployment, decommissioning, monitoring, and/or migration of the CVMs.

In various embodiments, the TMS may automatically deploy the CVMs based on anticipated usage patterns of the TMS, which may include, but are not limited to, packet traffic flow, a number of maintained connections, resource utilization, a particular task, resource utilization of a particular task, or any other anticipated usage patterns of the TMS. In some embodiments, the TMS may deploy the CVMs based on at least one deployment policy requirement, including, but not limited to, task specific, customer specific, server specific, service level specific, permission specific, capacity limits, latency restrictions, security requirements, or any other specific criterion.

Each CVM may be configured and/or enabled to perform one or more tasks of the TMS, including, but not limited to, packet protocol management, network protocol communication conversions, security operations, load balancing operations, network traffic optimization operations, network firewall operations and any other traffic management related task. In various embodiments, at least one CVM may perform operations, including, but not limited to, policy enforcement operations, policy reference operations, charging operations, data storage operations, server health monitoring operations, network monitoring operations, logging operations, reporting operations, encryption operations, compression operations, or any other network/policy enforcement related operation. In some embodiments, different CVMs may be optimized to operate in specific cloud infrastructures where they are deployed. In at least one embodiment, a CVM may support one or more different cloud infrastructure application program interfaces.

The TMS may deploy one or more CVMs locally and/or to one or more public and/or private clouds. In various embodiments, the TMS may load balance the CVMs across one or more cloud infrastructures. In some embodiments, deployment of the CVMs may be based on a type of task to be performed, anticipated resource utilization, customer policies, or the like. The deployment of the CVMs may be dynamically updated based on monitored usage patterns, task completions, customer policies, or the like. In some embodiments, at least one CVM may be initially deployed locally for execution on the TMS (e.g., on a local hypervisor) prior to being deployed to the cloud infrastructure based on a processing load of at least one of the CVM, the TMS, or any other processing resource. In other embodiments, a CVM may be migrated back to the TMS and/or deployed locally after being deployed to a cloud infrastructure. In some embodiments, a plurality of CVMs may be deployed to form a CVM cluster, where at least one of the CVMs in the CVM cluster works cooperatively with at least one other CVM in at least one of the CVM cluster or another CVM cluster to perform at least a portion of at least one task of the TMS.

Illustrative Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention.

As shown, system 100 of FIG. 1 includes local area networks (LANs)/wide area networks (WANs)-(network) 110, wireless network 108, client devices 102-105, traffic management system (TMS) 112, and server devices 114-115. Network 110 may be in communication with and enable communication between client devices 102-105, wireless network 108, and TMS 112. Wireless network 108 may enable communication with wireless devices, such as client devices 103-105. TMS 112 may be in communication with network 110 and server devices 114-115.

At least one embodiment of client devices 102-105 is described in more detail below in conjunction with FIG. 2. In one embodiment, at least some of client devices 102-105 may operate over a wired and/or wireless network, such as networks 110 and/or 108. Generally, client devices 102-105 may include virtually any computing device capable of communicating over a network to send and receive information, perform various online activities, offline actions, or the like. In one embodiment, one or more of client devices 102-105 may be configured to operate within a business or other entity to perform a variety of services for the business or other entity. For example, client devices 102-105 may be configured to operate as a web server, an accounting server, a production server, an inventory server, or the like. However, client devices 102-105 are not constrained to these services and may also be employed, for example, as an end-user computing node, in other embodiments. It should be recognized that more or less client devices may be included within a system such as described herein, and embodiments are therefore not constrained by the number or type of client devices employed.

Devices that may operate as client device 102 may include devices that typically connect using a wired or wireless conunmmunications medium such as personal computers, multiprocessor systems, microprocessor-based or programmable electronic devices, network PCs, or the like. In some embodiments, client devices 102-105 may include virtually any portable personal computing device capable of connecting to another computing device and receiving information such as, laptop computer 103, smart mobile telephone 104, and tablet computers 105, and the like. However, portable computing devices are not so limited and may also include other portable devices such as cellular telephones, display pagers, radio frequency (RF) devices, infrared (IR) devices, Personal Digital Assistants (PDAs), handheld computers, wearable computers, integrated devices combining one or more of the preceding devices, and the like. As such, client devices 102-105 typically range widely in terms of capabilities and features. Moreover, client devices 102-105 may access various computing applications, including a browser, or other web-based application.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), and the like, to display and send a message. In one embodiment, a user of the client device may employ the browser application to perform various activities over a network (online). However, another application may also be used to perform various online activities.

Client devices 102-105 also may include at least one other client application that is configured to receive and/or send content between another computing device. The client application may include a capability to send and/or receive content, or the like. The client application may further provide information that identifies itself, including a type, capability, name, and the like. In one embodiment, client devices 102-105 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client devices, TMS 112, server devices 114-115, or other computing devices.

Client devices 102-105 may further be configured to include a client application that enables an end-user to log into an end-user account that may be managed by another computing device, such as server devices 114-115, or the like. Such end-user account, in one non-limiting example, may be configured to enable the end-user to manage one or more online activities, including in one non-limiting example, search activities, social networking activities, browse various websites, communicate with other users, participate in gaming, interact with various applications, or the like. However, participation in online activities may also be performed without logging into the end-user account.

Wireless network 108 is configured to couple client devices 103-105 and its components with network 110. Wireless network 108 may include any of a variety of wireless sub-networks that may further overlay stand-alone ad-hoc networks, and the like, to provide an infrastructure-oriented connection for client devices 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile devices, such as client devices 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client devices 103-105 and another computing device, network, and the like.

Network 110 is configured to couple network devices with other computing devices, including, server devices 114-115 through TMS 112, client device 102, and client devices 103-105 through wireless network 108. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP). In essence, network 110 includes any communication method by which information may travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of TMS 112 is described in more detail below in conjunction with FIG. 3. Briefly, however, TMS 112 may include virtually any network device capable of managing network traffic between client devices 102-105 and server devices 114-115. Such devices include, for example, routers, proxies, firewalls, load balancers, cache devices, devices that perform network address translation, or the like, or any combination thereof. TMS 112 may perform the operations of routing, translating, switching packets, or the like. In one embodiment, TMS 112 may inspect incoming network packets, and may perform an address translation, port translation, a packet sequence translation, and the like, and route the network packets based, at least in part, on the packet inspection. In some embodiments, TMS may perform load balancing operations to determine a server device to direct a request. Such load balancing operations may be based on network traffic, network topology, capacity of a server, content requested, or a host of other traffic distribution mechanisms.

Server devices 114-115 may include virtually any network device that may operate as a website server. However, server devices 114-115 are not limited to website servers, and may also operate as messaging server, a File Transfer Protocol (FTP) server, a database server, content server, or the like. Additionally, each of server devices 114-115 may be configured to perform a different operation. In at least one embodiment of server devices 114-115 may be described in more detail below in conjunction with FIG. 3. Devices that may be arranged to operate as server devices 114-115 include various network devices, including, but not limited to personal computers, desktop computers, multiprocessor systems, microprocessor-based or programmable consumer electronics, network PCs, server devices, network appliances, and the like.

Although FIG. 1 illustrates server devices 114-115 as single computing devices, the invention is not so limited. For example, one or more functions of each of server devices 114-115 may be distributed across one or more distinct network devices. Moreover, server devices 114-115 are not limited to a particular configuration. Thus, in one embodiment, server devices 114-115 may contain a plurality of network devices that operate using a master/slave approach, where one of the plurality of network devices of server devices 114-115 operate to manage and/or otherwise coordinate operations of the other network devices. In other embodiments, the server devices 114-115 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
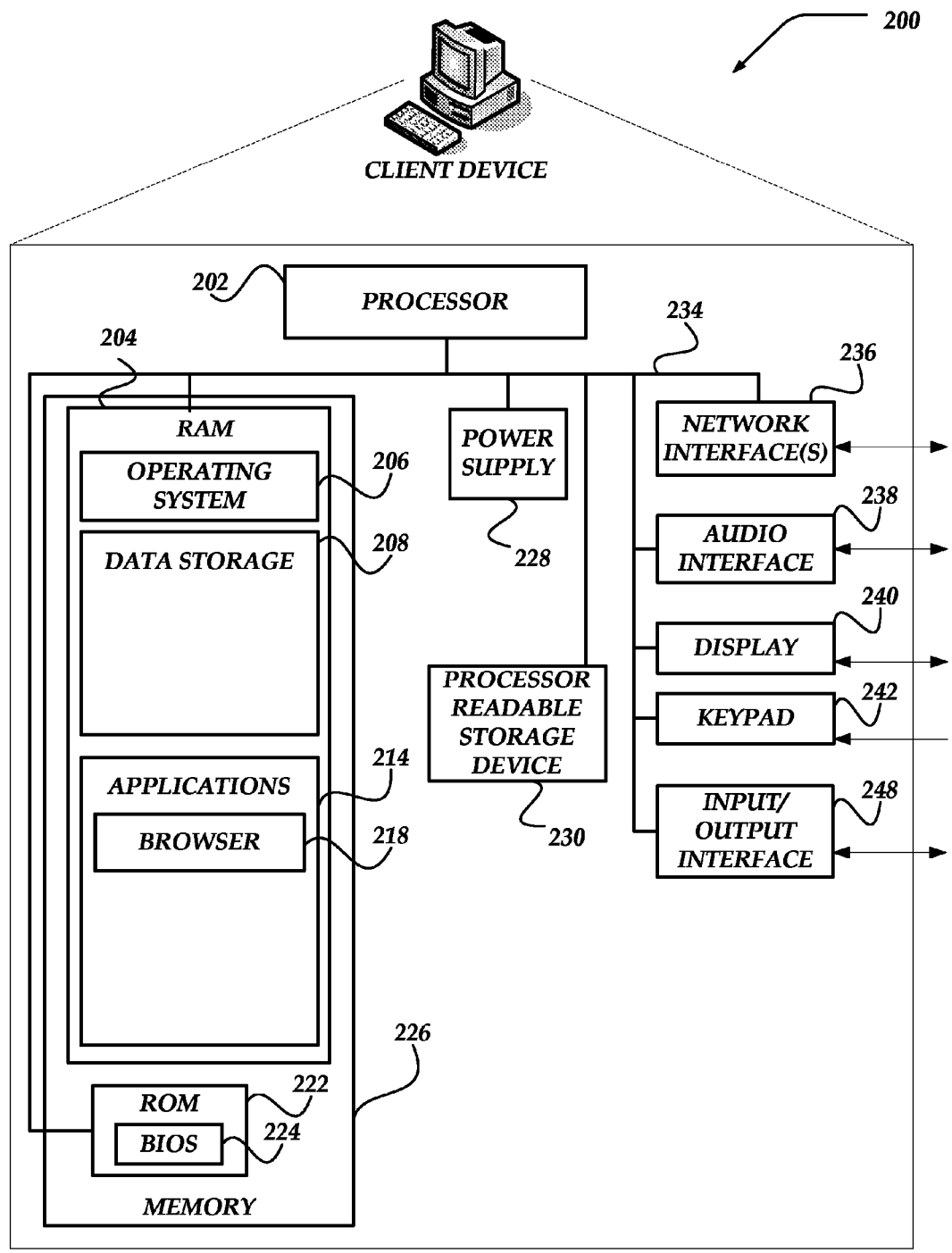
FIG. 2 shows an embodiment of a client device that may be included in a system such as that shown in FIG. 1.

FIG. 2 shows one embodiment of client device 200 that may be included in a system implementing embodiments of the invention. Client device 200 may include many more or less components than those shown in FIG. 2. However, the components shown are sufficient to disclose an illustrative embodiment for practicing the present invention. Client device 200 may represent, for example, one embodiment of at least one of client devices 102-105 of FIG. 1.

As shown in the figure, client device 200 includes a processor 202 in communication with a mass memory 226 via a bus 234. In some embodiments, processor 202 may include one or more central processing units (CPU). Client device 200 also includes a power supply 228, one or more network interfaces 236, an audio interface 238, a display 240, a keypad 242, an illuminator 244, a video interface 246, an input/output interface 248, a haptic interface 250, and a global positioning system (GPS) receiver 232.

Power supply 228 provides power to client device 200. A rechargeable or non-rechargeable battery may be used to provide power. The power may also be provided by an external power source, such as an alternating current (AC) adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Haptic interface 250 is arranged to provide tactile feedback to a user of the client device. For example, the haptic interface 250 may be employed to vibrate client device 200 in a particular way when another user of a computing device is calling. In some embodiments, haptic interface 250 may be optional.

Client device 200 may also include GPS transceiver 232 to determine the physical coordinates of client device 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client device 200 on the surface of the Earth. It is understood that under different conditions, OPS transceiver 232 can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control (MAC) address, IP address, or the like.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™ or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store social networking information including address books, buddy lists, aliases, user profile information, or the like. Further, data storage 208 may also store message, we page content, or any of a variety of user generated content. At least a portion of the information may also be stored on another component of network device 200, including, but not limited to processor readable storage media 230, a disk drive or other computer readable storage devices (not shown) within client device 200.

Processor readable storage media 230 may include volatile, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device. Processor readable storage media 230 may also be referred to herein as computer readable storage media and/or computer readable storage device.

Applications 214 may include computer executable instructions which, when executed by client device 200, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another client device. Applications 214 may include, for example, browser 218, and other applications 220. Other applications 220 may include, but are not limited to, calendars, search programs, email clients, IM applications, SMS applications, voice over Internet Protocol (VOIP) applications, contact managers, task managers, transcoders, database programs, word processing programs, security applications, spreadsheet programs, games, search programs, and so forth.

Browser 218 may include virtually any application configured to receive and display graphics, text, multimedia, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client device 200 to communicate with another network device, such as TMS 112 and/or indirectly with server devices 114-115.

Illustrative Network Device

Figure 3:
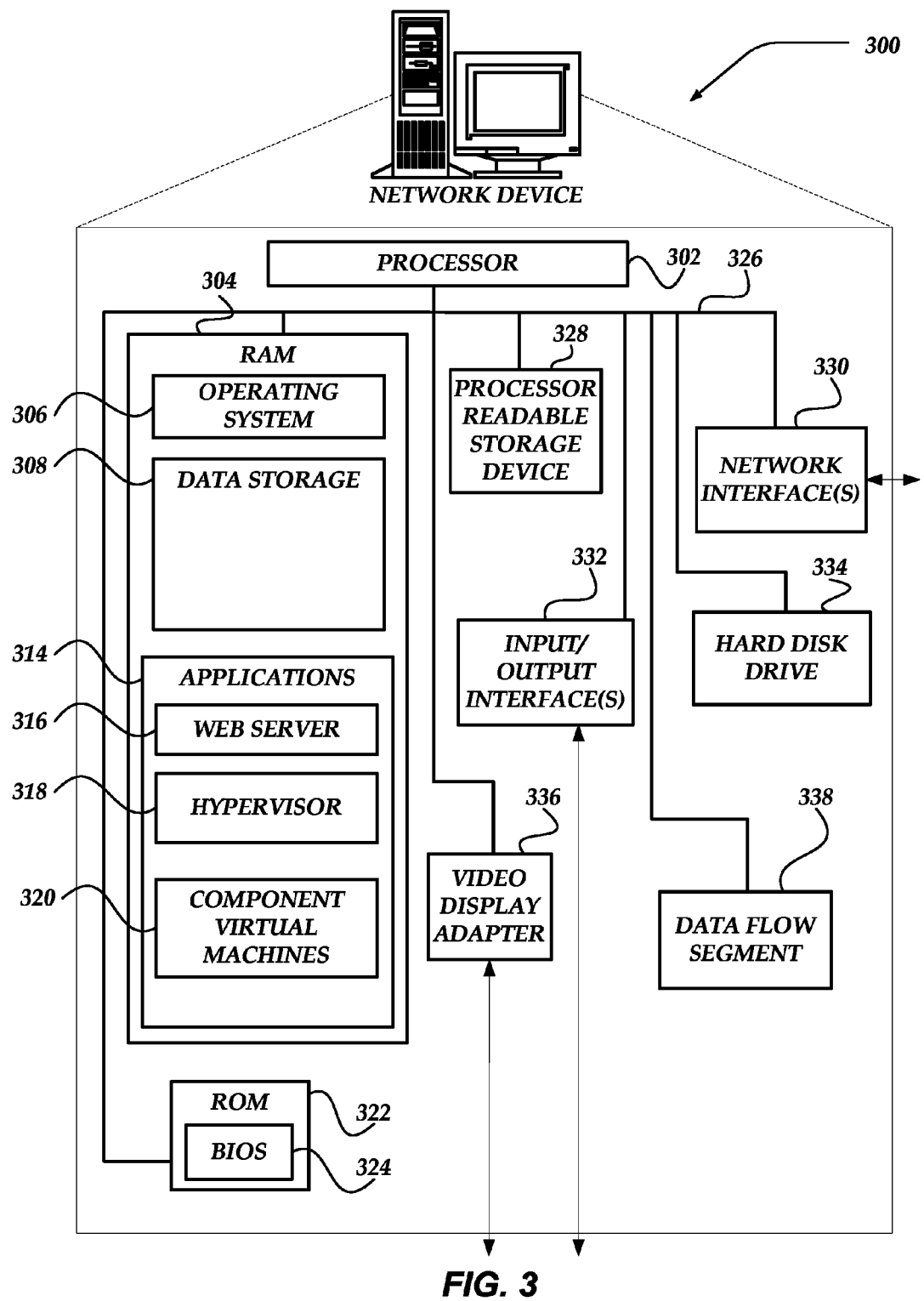
FIG. 3 illustrates an embodiment of a network device that may be included in a system such as that shown in FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, client, peer, a host, or any other device. Network device 300 may represent, for example TMS 112 of FIG. 1, server devices 114-115 of FIG. 1, and/or other network devices.

Network device 300 includes processor 302, processor readable storage media 328, network interface unit 330, an input/output interface 332, hard disk drive 334, video display adapter 336, and memory 326, all in communication with each other via bus 338. In some embodiments, processor 302 may include one or more central processing units.

As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network device 300. Any general-purpose operating system may be employed. Basic input/output system (BIOS) 324 is also provided for controlling the low-level operation of network device 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 326 further includes one or more data storage 308, which can be utilized by network device 300 to store, among other things, applications 314 and/or other data. For example, data storage 308 may also be employed to store information that describes various capabilities of network device 300. The information may then be provided to another device based on any of a variety of events, including being sent as part of a header during a communication, sent upon request, or the like. Data storage 308 may also be employed to store messages, web page content, or the like. At least a portion of the information may also be stored on another component of network device 300, including, but not limited to processor readable storage media 328, hard disk drive 334, or other computer readable storage medias (not shown) within client device 300.

Data storage 308 may include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor, such as processor 302 to execute and perform actions. In one embodiment, at least some of data store 308 might also be stored on another component of network device 300, including, but not limited to processor-readable storage media 328, hard disk drive 334, or the like.

Applications 314 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 314 may also include website server 316, hypervisor 318, and component virtual machines (CVM) 320.

Website server 316 may represents any of a variety of information and services that are configured to provide content, including messages, over a network to another computing device. Thus, website server 316 can include, for example, a web server, a File Transfer Protocol (FTP) server, a database server, a content server, or the like. Website server 316 may provide the content including messages over the network using any of a variety of formats including, but not limited to WAP, HDML, WML, SGML, HTML, XML, Compact HTML (cHTML), Extensible HTML (xHTML), or the like.

Hypervisor 318 may be configured to manage one or more virtualized guest applications and/or guest operating systems that may be operating on network device 300. In at least one of the various embodiments, guest applications may be virtualized hosts that may be operating under the management of hypervisor 318. In some embodiments, hypervisor 318 may manage one or more of CVM 320 if deployed locally by TMS 112 of FIG. 1. In at least one embodiment, CVM 320 may include one or more component virtual machines that can be deployed locally (e.g., on TMS 112 of FIG. 1) and/or remotely on a cloud.

System Overview

Figure 4A:
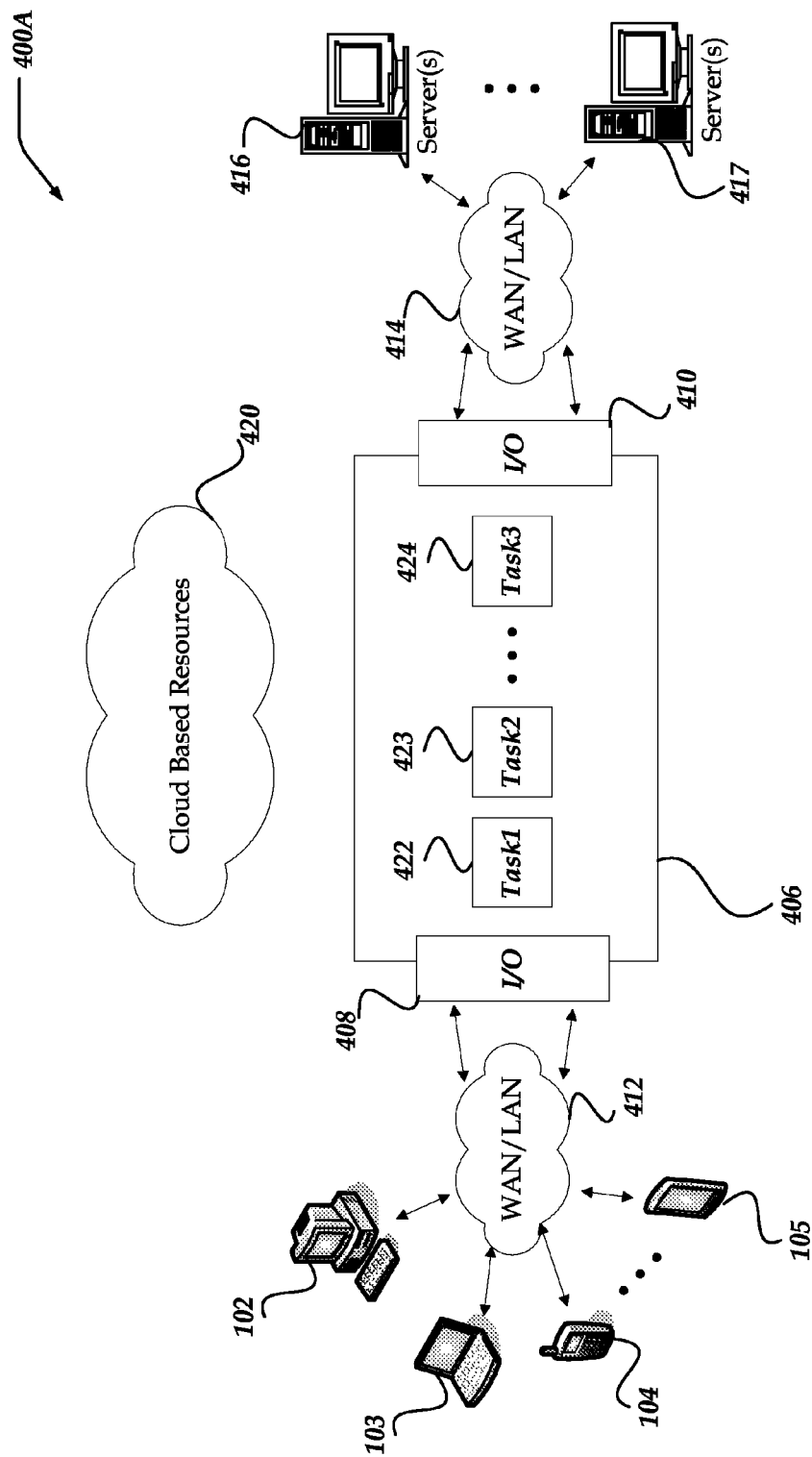
FIGS. 4A and 4B show overview system diagrams generally showing embodiments of a traffic management system disposed between client devices and server devices.

FIG. 4A illustrates a system diagram generally showing one embodiment of a system with a traffic management system disposed between client devices and server devices. System 400A may include traffic management system (TMS) 406 disposed between client devices 102-105 and servers 416-417. System 400A may also include cloud 420. Cloud 420 may include cloud based resources, which may be a private accessible cloud and/or a public cloud.

TMS 406 may include input/output 408 to communicate with client devices 102-105 through network 412. In at least one embodiment, network 412 may be an embodiment of network 108 and/or 110 of FIG. 1. TMS 406 may also include input/output 410 to communicate with servers 416-417 through network 414. In at least one embodiment, network 414 may be an embodiment of network 108 and/or 110 of FIG. 1. In some embodiments, network 412 and 414 may include and/or employ a same network and/or different networks. Servers 416-417 may be embodiments of server devices 114-115 of FIG. 1.

TMS 406 may be configured to perform a plurality of tasks, such as, load balancing, server monitoring, session monitoring, log and/or event monitoring, object data management, or the like. These tasks may be illustrated in FIG. 4 as tasks 422-424.

Figure 4B:
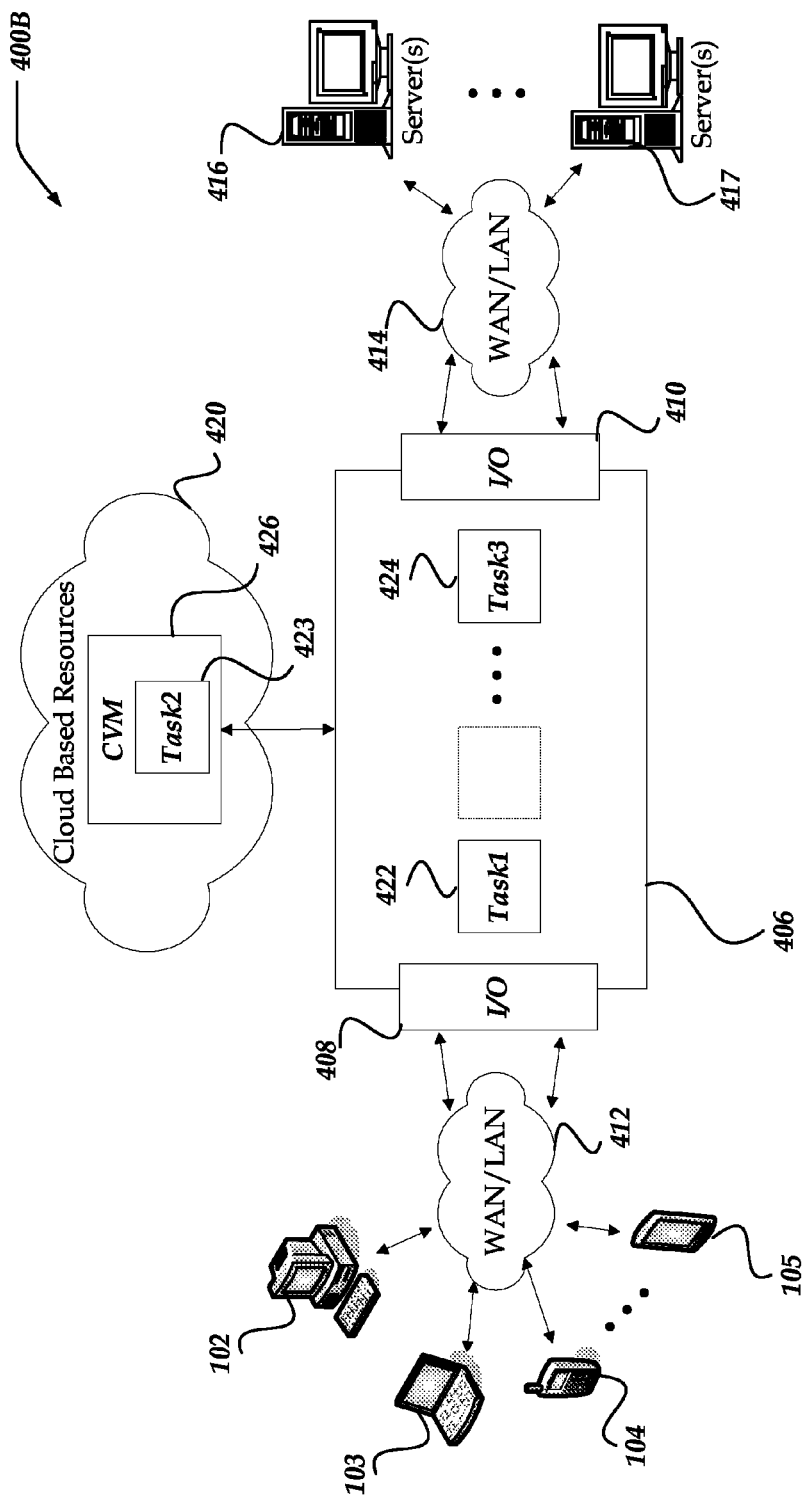

FIG. 4B illustrates a system diagram generally showing one embodiment of a system with a traffic management system disposed between client devices and server devices. In at least one embodiment, FIG. 4B may be an embodiment of FIG. 4A. System 400B may include traffic management system (TMS) 406 disposed between client devices 102-105 and servers 416-417. System 400A may also include cloud 420. TMS 406 may include input/output 408 to communicate with client devices 102-105 through network 412. TMS 406 may also include input/output 410 to communicate with servers 416-417 through network 414.

By employing embodiments as described in more detail below, TMS 406 may offload a task, such as task 423 to cloud 420. In some embodiments, TMS 406 may deploy Component Virtual Machine (CVM) 426 to execute task 423 utilizing cloud 420 resources.

Figure 5:
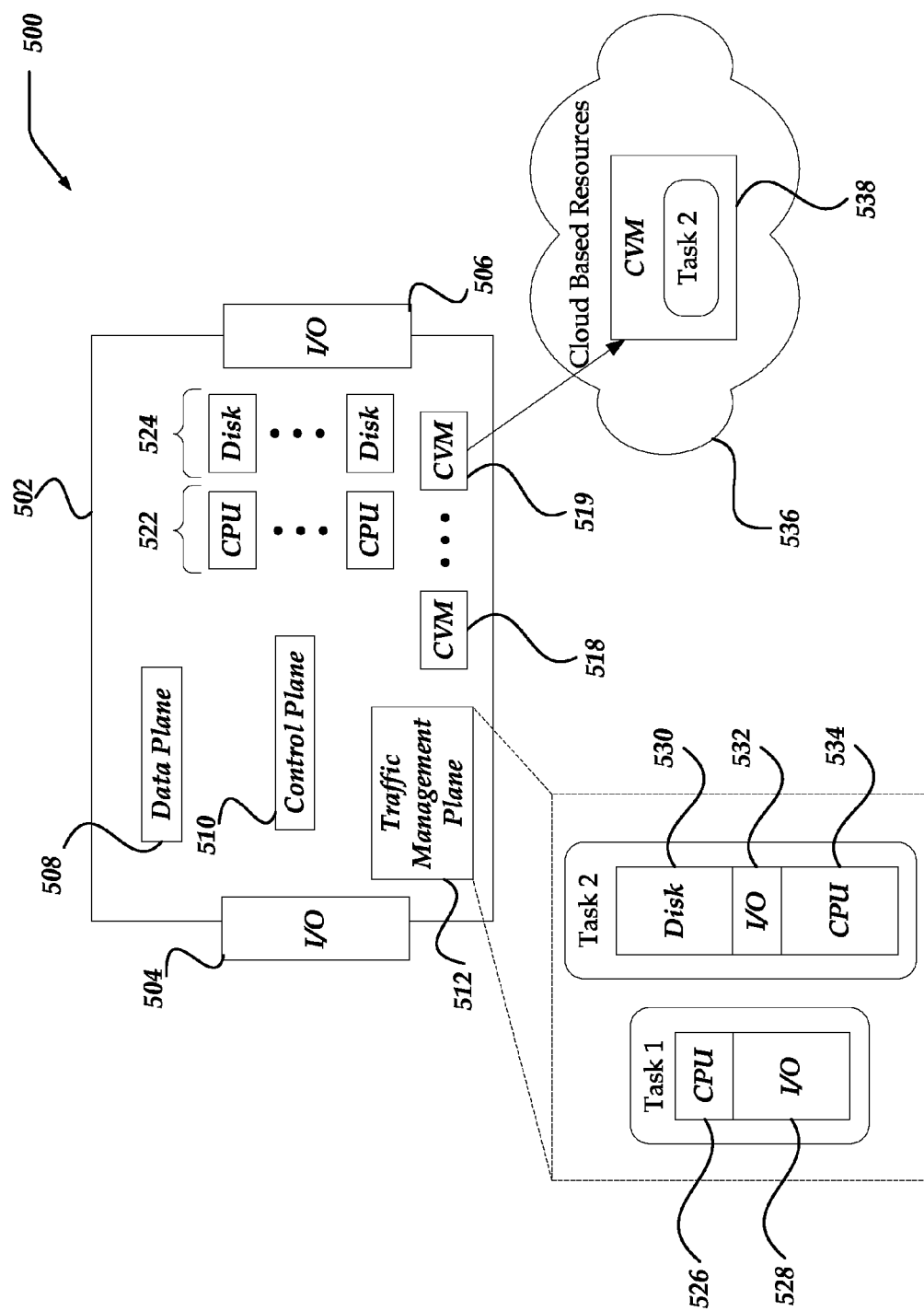
FIG. 5 shows an overview system diagram generally showing an embodiment of a traffic management system.

FIG. 5 shows an overview system diagram generally showing an embodiment of a traffic management system. Traffic management system (TMS) 502 may include input/output 504 and 506, CPUs 522, Disks 524, data plane 508, control plane 510, and traffic management plane 512. Data plane 508, control plane 510, and/or traffic management plane 512 may utilize CPUs 522 and/or disks 524 to perform actions.

Data plane 508 may maintain contention flows between client devices and servers. Control plane 510 may perform high-level control functions and/or per-flow policy enforcement for packet traffic management. Traffic management plane 512 may manage and/or coordinate the performance of tasks associated with traffic management.

For example, traffic management plane 512 may employ Task_1 and Task_2. It should be recognized that fewer or more task than what is illustrated in FIG. 5 may be employed. As illustrated, Task_1 may utilize a variety of resources, such as CPU 526 and I/O 528. Task_2 may also utilize resources, such as disk 530, I/O 532, and CPU 534. In some embodiments, as illustrated, a size of a resource block for a task may be representative of an amount of resources for that particular resource utilized by the task. For example, I/O 528 is larger than I/O 532, which may indicate that Task_1 may utilize more I/O resources than Task_2.

TMS 502 may also include component virtual machines (CVMs) 518-519. In various embodiments, CVMs 518-519 may include images of each CVM. In some embodiments, each CVM may be configured to be operable with different cloud infrastructures and/or perform different tasks.

By employing embodiments, as described in more detail below, TMS 502 (e.g., traffic management plane 512) may determine to offload one or more tasks (e.g., Task_1, Task_2, or the like) and/or perform tasks locally. For example, Task 11 may utilize a high amount of I/O resources (e.g., I/O 528) compared to CPU resources (e.g., CPU 526). Accordingly, TMS 502 may determine to perform Task_1 locally on TMS 502. In contrast, Task_2 may utilize a high amount of disk and CPU resources (e.g., disk 530 and CPU 534, respectively) compared to I/O resources (e.g., I/O 532). Accordingly, TMS 502 may determine to offload Task_2 to cloud 536. In at least one embodiment, TMS 502 may determine which CVM (e.g., CVM 518-519) is compatible with cloud 536. As illustrated, CVM 519 may be compatible with cloud 536. TMS 502 may deploy CVM 519, as CVM 538 on cloud 536 to perform Task_2. In some embodiments, cloud 536 may be on a same machine as TMS 502, but may have separate and/or dedicated hardware for cloud 536. In other embodiments, TMS 502 and cloud 536 may be separate and/or distinct devices.

Figure 6A:
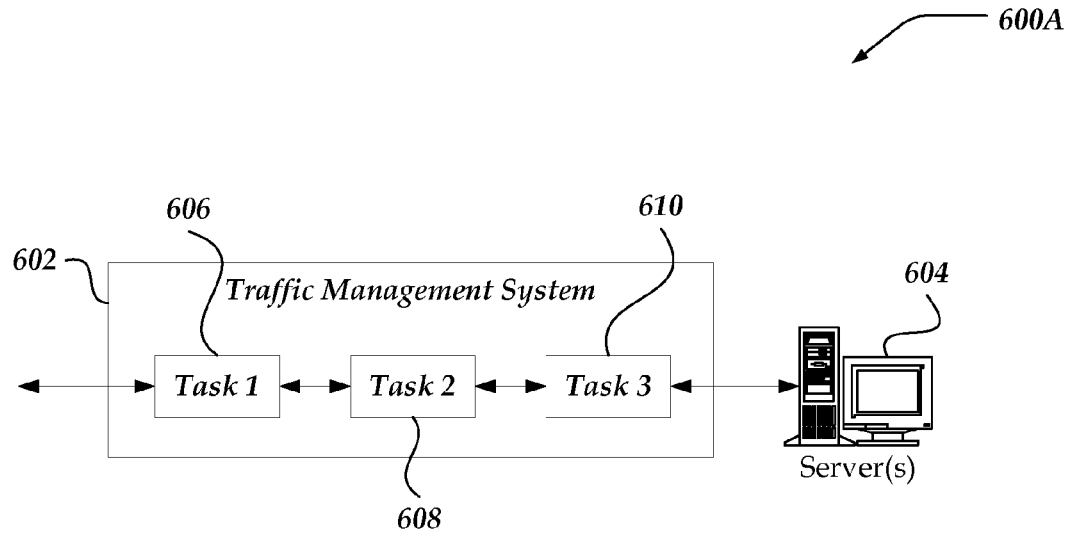
FIGS. 6A-6C illustrate system diagrams generally showing embodiments of a traffic management system employing a dynamic pipeline to perform tasks.
Figure 6B:
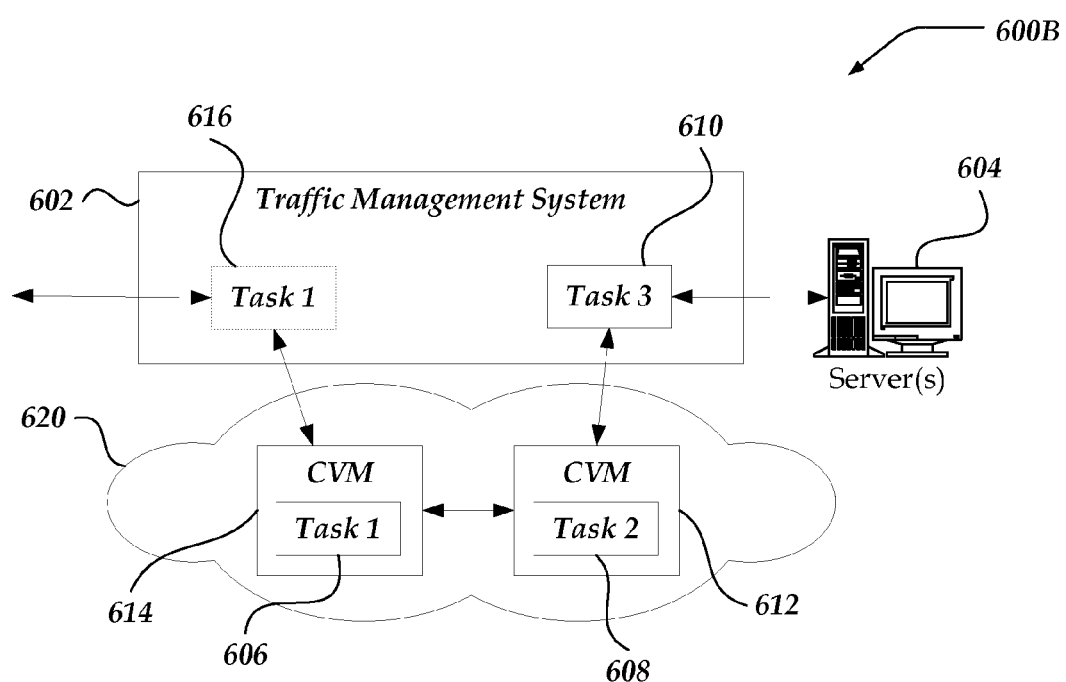
Figure 6C:
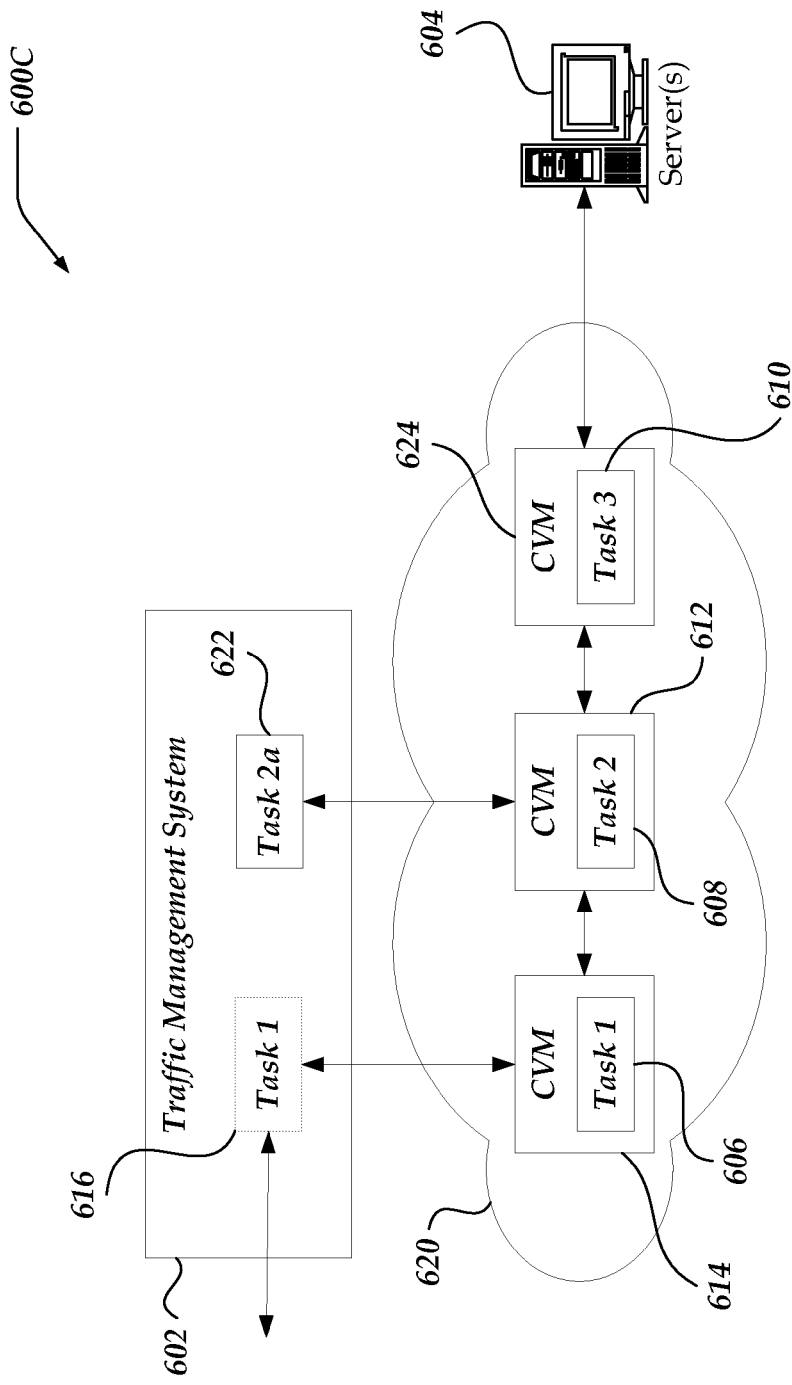

FIGS. 6A-6C illustrate system diagrams generally showing embodiments of a traffic management system employing a dynamic pipeline to perform tasks. FIG. 6A illustrates a system diagram generally showing one embodiment of a traffic management system employing a pipeline of tasks. System 600A may include traffic management system (TMS) 602 in communication with servers 604. In some embodiments, TMS 602 may be an embodiment of TMS 406 of FIG. 4. TMS 602 may employ tasks 606, 608, and 610. Although FIG. 6A only shows three tasks, the invention is not so limited and more or less tasks may be employed by TMS 602. As illustrated, TMS 602 may employ tasks 606, 608, and 610 on traffic passing through TMS 602, such as between client devices (not shown) and severs 604. For example, task 606 may perform packet protocol management, task 608 may perform security operations, and task 610 may perform load balancing operations. However, the invention is not limited to these tasks and other tasks may be employed by TMS 602.

FIG. 6B illustrates a system diagram generally showing an alternative embodiment of a traffic management system employing a pipeline of tasks. System 600B may include TMS 602 in communication with servers 604. As illustrated, TMS 602 may offload tasks 606 and 608 to cloud 620. In some embodiments, cloud 620 may include one or more different cloud based systems. TMS 602 may deploy CVM 614 on cloud 620 to perform task 606. Additionally, TMS 602 may deploy CVM 612 on cloud 620 to perform task 608.

An example packet flow may include the following steps. TMS 602 may receive packets from a client device (not shown) and forward them to CVM 614. In some embodiments, TMS 602 may include task 616 for forwarding packets between TMS 602 and CVM 614. CVM 614 may perform task 606 on the packets and may then forward the packets to CVM 612. CVM 612 may perform task 608 on the packets and may then forward the packets back to TMS 602. TMS 602 may perform task 610 on the packets and may then forward the packets to server 604. Such a pipeline may also be performed in the opposite direction with packets received from server 604. In some embodiments, different pipelines utilizing different CVMs may be employed for packets in different directions, packets directed to different servers, different types of packets, or the like. In some embodiments, the TMS and/or a CVM may convert packets from one protocol to another protocol that may be optimized for communications between the TMS and CVM, between different CVMs, or the like.

FIG. 6C illustrates a system diagram generally showing an alternative embodiment of a traffic management system employing a pipeline of tasks. System 600C may include TMS 602 in communication with servers 604. As illustrated, TMS 602 may offload tasks 606, 608, and 610 to cloud 620. In some embodiments, cloud 620 may include one or more different cloud based systems. TMS 602 may deploy CVM 614 on cloud 620 to perform task 606, may deploy CVM 612 on cloud 620 to perform task 608, and may deploy CVM 624 on cloud 620 to perform task 610. In some embodiments, CVM 614, 612, and/or 624 may be based on a same and/or different images managed by TMS 602. In some embodiments, TMS 602 may communicate with one or more CVMs in the pipeline. For example, CVM 612 may communicate with task 622 before and/or in conjunction with performing task 608.

An example packet flow may include the following steps. TMS 602 may receive packets from a client device (not shown) and forward them to CVM 614. CVM 614 may perform task 606 to on the packets and may then forward the packets to CVM 612. CVM 612 may communicate with task 622 operating and/or executing on TMS 602 to perform task 608 on the packets and may then forward the packets to CVM 624. CVM 624 may perform task 610 on the packets and may then forward the packets to server 604. Such a pipeline may also be performed in the opposite direction with packets received from server 604. In some embodiments, different pipelines utilizing different CVMs may be employed for packets in different directions, packets directed to different servers, different types of packets, or the like.

Generalized Operation

Figure 7:
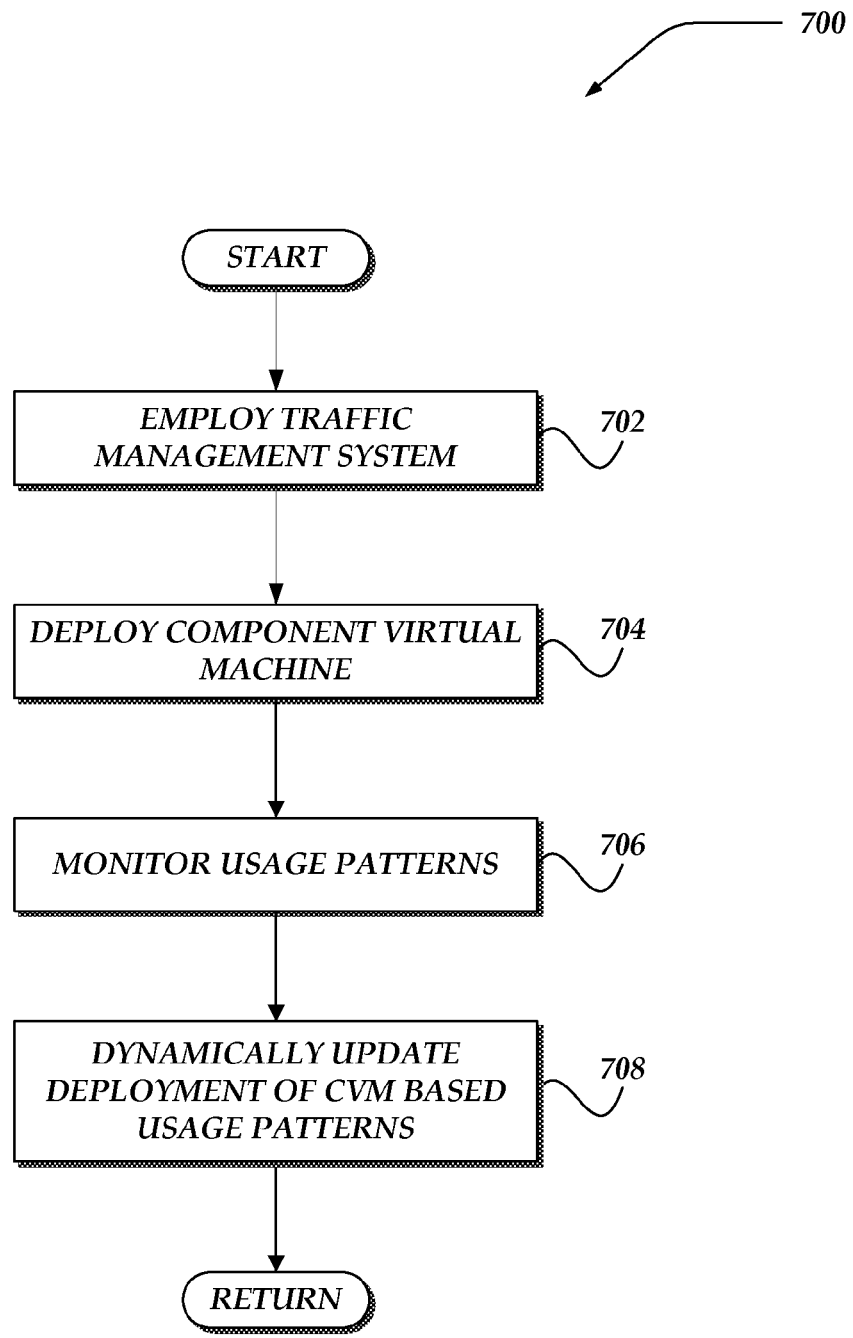
FIG. 7 illustrates a logical flow diagram generally showing one embodiment of an overview process for employing a traffic management system to deploy component virtual machines.

The operation of certain aspects of the invention will now be described with respect to FIG. 7. FIG. 7 illustrates a logical flow diagram generally showing one embodiment of an overview process for employing a traffic management system to deploy component virtual machines. In some embodiments, process 700 of FIG. 7 may be implemented by and/or executed on a single network device, such as network device 300 of FIG. 3. In other embodiments, process 700 or portions of process 700 of FIG. 7 may be implemented by and/or executed on a plurality of network devices, such as network device 300 of FIG. 3.

Process 700 may begin, after a start block, at block 702, where a traffic management system (TMS) may be employed. In at least one embodiment, the traffic management system may be a traffic management device, a packet traffic management device, or the like. In other embodiments, the TMS may be a prebuilt system and/or appliance. The TMS may be sold and/or provided to a customer. The TMS may be operated and/or executed on the customer's hardware. The customer's hardware may include any of a number of different hardware platforms and/or configurations, which may and/or may not be optimized for and/or provide optimized support to the TMS. In some other embodiments, the TMS may be in a cluster with one or more other traffic managers.

In some embodiments, the TMS may include one or more component virtual machines (CVM). Each CVM may provide a service that can be utilized by the TMS when the CVM is deployed. In at least one embodiment, each CVM may include proprietary components that may be enabled to perform different actions and/or execute different tasks. In another embodiment, each CVM be configured to support and/or be optimized for different cloud infrastructures. For example, each CVM may support different Cloud APIs, such as, but not limited to VMware, OpenStack, or the like. In at least one embodiment, the TMS may maintain an image of each of a plurality of CVM. In some embodiments, the CVMs may belong to the TMS, not to a customer.

As described in more detail below, the TMS may offload one or more tasks by deploying one or more CVMs. Deployment of a CVM may include providing the CVM to an external compute/storage infrastructure, which may be referred to as a cloud. In some embodiments, the TMS may not be dependent on other particular services available from the cloud system to support offload of a task, other than a standardized elastic compute/storage API to enable deployment of the CVM.

The TMS may include a single CVM that may perform a plurality of tasks and/or a plurality of CVMs that each performs a different task. In some embodiments, a CVM may perform server health monitoring. In other embodiments, a CVM may manage and/or store monitoring information, such as, but not limited to, logs, events, alters, statistics, sessions, transactions, transaction summaries, other information generated by the TMS, or the like. In some other embodiments, a CVM may be employed for storing shared state information (e.g., user sessions, which may be needed by one or more traffic managers), for storing object data (e.g., files, cached HTTP responses, or the like), or the like. In at least one embodiment, a CVM may be enabled to perform additional manipulation of the stored information, such as, but not limited to, encrypting, compressing, searching, sorting, summarizing, pushing to a cloud storage dropbox, or the like.

In some embodiments, the data may be encrypted on the CVM. In other embodiments, data transported between the CVM and the TMS and/or between multiple CVMs may be encrypted. For example, in one embodiment, a CVM may stream data, encrypt the data, and store the encrypted data at the CVM. In some embodiments, a CVM may be enabled to encrypt data and the TMS may be enabled to decrypt the data. In at least one such embodiment, the CVM may not be able to decrypt data. In yet other embodiments, the encryption may be bidirectional between a CVM and TMS and/or multiple CVMs.

In other embodiments, the TMS may be capable of performing load balancing technologies. In at least one embodiment, the TMS may load balance one or more CVMs across one or more clouds. Accordingly, the TMS may load balance CVM features. In another embodiment, the TMS may utilize integrated dynamic load balancing and capacity analysis functions for utilizing, provisioning, and de-provisioning CVMs. For example, a plurality of CVMs may be deployed to perform a specific task and/or function, e.g., an administrative function of collecting log data. The TMS may perform load balancing across the plurality of CVMs such that a load of each of the plurality of CVMs is within a given threshold.

In some embodiments, the TMS may include a user interface, which may enable a user and/or customer to manage deployment of the CVMs. For example, a customer may indicate which cloud to utilize. In at least one embodiment, the TMS may include a CVM that may be enabled to offload the user interface and/or other management interfaces of the TMS, such as, but not limited to, the Simple Network Management Protocol (SNMP) interface, Representational State Transfer (REST) interface, Simple Object Access Protocol (SOAP) interface, or the like. The CVM may also offload other related configuration data and/or status that may be kept by the TMS.

In other embodiments, a remote API may enable a user, customer, and/or administrator to manage the TMSs deployment of one or more CVMs. In at least one such embodiment, this API may enable a user to write and/or create their own user interface to manage the TMS. The user may be enabled to control the TMS by providing parameters for how (e.g., in a cluster of CVMs), when (e.g., when a resource performance falls below a threshold for the TMS), and/or where (e.g., public cloud) CVMs may be deployed.

In any event, process 700 proceeds next to block 704, where one or more CVMs may be deployed. In some embodiments, CVMs may be deployed based on anticipated usage patterns. Usage patterns may include, but are not limited to, packet traffic flow, number of maintained connections, resource utilization (e.g., memory and/or disk space, processor utilization, input/output operations, or the like), or the like. In at least one embodiment, CVMs may be deployed on a task by task basis. For example, if the anticipated usage for a given task is above a predefined threshold value, then a CVM may be deployed to perform the task (i.e., the given task may be offloaded from the TMS to the cloud). In some embodiments, a capacity of the CVM (e.g., processor utilization, available disk space, or the like) may be determined based on the task being offloaded.

In other embodiments, CVMs may be deployed based on one or more policy requirements. Policy requirements may be task specific, customer specific, server specific, or the like. For example, a CVM may be automatically deployed for a specific task, independent of the anticipated usage patterns. In at least one embodiment, the TMS may offload specific functions related to customer and/or user traffic to a CVM based on a quality of service level configured and/or dynamically determined for the given customer or user. In another embodiment, customers may be in different tiers, where each tier includes different permissions. Tiers may be based on capacity limits, latency restrictions, security requirements, or the like. For example, a high security transaction may be performed local, but a low security transaction may be performed by a CVM on the cloud.

In at least one embodiment, the TMS may deploy CVMs to perform policy enforcement operations, policy reference operations, charging operations, data storage operations, or the like. In some embodiments, data storage operations may be performed in one or more CVMs separate from the policy enforcement operations, which may enable the storage capacity to be scalable beyond a capacity of the TMS. The scalability may be based on the amount of data to store (i.e., a size of a database) and a number of CVMs employed to perform the storage operations.

In various embodiments, the CVM may be deployed to a cloud. The cloud may be a private cloud and/or a public cloud. A private cloud may have restricted access by specific devices and/or entities. A public cloud may have unrestricted access. In at least one embodiment, the TMS may be enabled to deploy the CVMs to a set of cloud infrastructures.

In some embodiments, the TMS may initiate a task in a CVM that is local to the TMS. The TMS may then deploy and/or push the CVM to the cloud. In some embodiments, the TMS may determine if and/or when to push a CVM to the cloud based on a load of the CVM and/or TMS. In at least one embodiment, pushing a CVM to the cloud may include tradeoffs, for example, moving a CVM to the cloud may enable more processing speed, but may incur more I/O latency. This tradeoff may be compared to the load of a local CVM to determine if the CVM may be pushed to the cloud.

In some embodiments, deployment of CVMs by the TMS may include running the CVMs in a local hypervisor included with the TMS. In at least one embodiment, the TMS may be enabled to support dynamic movement of CVMs from local to cloud hypervisors (e.g., by vmotion). In at least one embodiment, the TMS may be enabled to switch between using a local CVM or a remote CVM in a cloud. In another embodiment, the TMS may automatically switch to a remote CVM after the CVM is deployed in the cloud. In other embodiments, the TMS may instantiate tunnels between offloaded CVMs and the TMS. In at least one embodiment, the TMS may be enabled to deploy a CVM to an appropriate cloud based on existing load of a cloud and/or remaining capacity of that cloud (i.e., available resources).

In some embodiments, the TMS may be enabled to deploy a CVM to a cloud that is geographically more appropriate to accomplish a given task. For example, a CVM that monitors a server may be deployed on a Cloud that is geographically (and/or logically) closer to the servers than the TMS (and/or another cloud). In other embodiments, the TMS may deploy a CVM based on a security policy. In some embodiments, the TMS may be enabled to deploy a CVM to a cloud that is security sensitive, such as a public cloud or a private cloud based on the task performed by the CVM.

In some embodiments, the TMS may be capable of receiving a stream of data from the CVM. Such data may include, but is not limited to a status of the CVM, alerts, reports regarding data stored and/or monitored by the CVM, or the like. In some embodiments, data transmitted from a CVM to the TMS may be summarized data and/or may include changes (e.g., deltas) in the data. In at least one embodiment, the CVM may be enabled to provide the stream of data to the TMS, to other CVMs, other traffic managers, or the like.

In some embodiments, a plurality of CVMs may be deployed in such a way that they may form one or more clusters. Each CVM in a cluster may work cooperatively with each other and/or each cluster may work cooperatively with another cluster. For example, a CVM cluster may be enabled to perform a distributed query. In another example, the CVM cluster may be enabled to replicate data to another CVM in a same and/or a different cloud, which may provide redundancies to support CVM failure. In at least one embodiment, the TMS may initialize a CVM cluster by deploying a CVM as a master node and deploying other CVMs as servant nodes, where each deployed CVM knows of the other CVMs in the same cluster.

Process 700 continues at block 706, where usage patterns associated with the deployed CVMs may be monitored. In some embodiments, the TMS may obtain a periodic heartbeat from a CVM. The periodic heartbeat may advertise that the CVM is still in communication with the TMS and/or other CVMs (e.g., the CVM is reachable and alive). The periodic heartbeat may also indicate whether the CVMs able to perform a given task. If the TMS (and/or other CVM) does not receive the periodic heartbeat, then the CVM may not be in communication with the TMS (and/or other CVM) and/or the CVM may not be able to perform the given task. In some embodiments, the TMS may be enabled to detect failure of a deployed CVM, such as based on the periodic heartbeat or an unresponsive CVM to a request from the TMS.

In other embodiments, the TMS may periodically monitor a workload of the CVMs. In at least one embodiment, the CVMs may provide a current resource utilization, performance indicator, or the like, to the TMS.

Process 700 proceeds next to block 708, where the deployment of the CVMs may be automatically and/or dynamically updated. In at least one embodiment, the updating may be based on the monitored usage patterns. In other embodiments, as noted above, the TMS may perform load balancing functions on the CVMs. Accordingly, the deployment of one or more CVMs may be dynamically updated based on a workload of each CVM (i.e., the CVMs may be load balanced).

In some embodiments, the TMS may resume local processing on the TMS of an overloaded and/or failed CVM. In other embodiments, the TMS may deploy another CVM to a same cloud and/or a different cloud.

After block 708, process 700 may return to a calling process to perform other actions. In some embodiments, process 700 may loop (not shown) to block 706 to continue to monitor the usage patterns associated with the deployed CVMs and to dynamically update the deployment based on those monitored usage patterns (e.g., at block 708).

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A method for managing communication over a network, comprising:
   employing a traffic management system (TMS) for packet flows over the network, wherein the TMS includes information for deploying one or more component virtual machines (CVM) to a separate cloud infrastructure and locally for execution on the TMS, wherein each deployed CVM is enabled to perform one or more tasks of the TMS;
   automatically deploying the one or more CVMs to the separate cloud infrastructure to perform a low security task of the TMS based on one or more of a usage pattern or a CVM deployment policy;
   automatically deploying, locally, the one or more CVMs to execute a high security task;
   monitoring a periodic heartbeat for each deployed CVM, wherein the heartbeat advertises one or more of being in current communication with the TMS, in current communication with one or more other deployed CVMs, or an ability of a CVM to perform a task; and
   monitoring usage patterns associated with each deployed CVM to determine a corresponding workload of each deployed CVM.

2. The method of claim 1, further comprising:
   dynamically updating deployment of the one or more deployed CVMs based on the usage patterns and the corresponding workload of each of the deployed CVMs.

3. The method of claim 1, wherein the one or more CVMs is optimized to operate in the cloud infrastructure where it is deployed.

4. The method of claim 1, wherein the one or more tasks of the TMS comprises one or more of packet protocol management, network protocol communication conversions, security operations, load balancing operations, network traffic optimization operations, network firewall operations, or any other traffic management related task.

5. The method of claim 1, wherein the TMS implements a user interface that enables an administrator to manage configuration, deployment, decommissioning, monitoring, and migration of the one or more CVMs.

6. The method of claim 1, further comprising:
   employing a remote application programming interface that enables an administrator to manage the TMS's deployment of the one or more CVMs.

7. The method of claim 1, further comprising:
   deploying the one or more CVMs based on anticipated usage patterns of the TMS, the anticipated usage patterns comprising at least one of packet traffic flow, a number of maintained connections, resource utilization, a particular task, resource utilization of a particular task, or any other anticipated usage patterns of the TMS.

8. The method of claim 1, wherein the one or more CVMs is initially deployed locally for execution on the TMS prior to being deployed to the cloud infrastructure based on a processing load of the one or more CVMs, the TMS or any other processing resource.

9. The method of claim 1, wherein the TMS deploys the one or more CVMs locally for execution on a local hypervisor prior to or after deploying the one or more CVMs to the cloud infrastructure.

10. The method of claim 1, further comprising:
    deploying a plurality of CVMs to form a CVM cluster, wherein the one or more CVMs in the CVM cluster works cooperatively with one or more other CVMs in one or more of the CVM cluster or another CVM cluster to perform one or more portions of the one or more tasks.

11. The method of claim 1, wherein the TMS deploys the CVM based on one or more of deployment policy requirement comprising at least one of task specific, customer specific, server specific, service level specific, permission specific, capacity limits, latency restrictions, security requirements, or any other specific criterion.

12. The method of claim 1, wherein the one or more CVMs performs one or more of policy enforcement operations, policy reference operations, charging operations, data storage operations, server health monitoring operations, network monitoring operations, logging operations, reporting operations, encryption operations, compression operations, or any other network/policy enforcement related operation.

13. The method of claim 1, wherein the one or more CVMs support one or more different cloud infrastructure application program interfaces.

14. The method of claim 1, wherein the TMS load balances the one or more CVMs across one or more cloud infrastructures.

15. A non-transitory computer readable storage medium having stored thereon computer-executable instructions, which when executed by one or more processors, causes the one or more processors to be capable of performing one or more actions to manage communication over a network, comprising:
    employing a traffic management system (TMS) for packet flows over the network, wherein the TMS includes information for deploying one or more component virtual machines (CVM) to a separate cloud infrastructure and locally for execution on the TMS, wherein each deployed CVM is enabled to perform one or more tasks of the TMS;
    automatically deploying the one or more CVMs to the separate cloud infrastructure to perform a low security task of the TMS based on one or more of a usage pattern or a CVM deployment policy;
    automatically deploying, locally, the one or more CVMs to execute a high security task;
    monitoring a periodic heartbeat for each deployed CVM, wherein the heartbeat advertises one or more of being in current communication with the TMS, in current communication with one or more other deployed CVMs, or an ability of a CVM to perform a task; and monitoring usage patterns associated with each deployed CVM to determine a corresponding workload of each deployed CVM.

16. The non-transitory computer readable storage medium of claim 15, further comprising:

dynamically updating deployment of the one or more deployed CVMs based on the usage patterns and the corresponding workload of each of the deployed CVMs.

17. The non-transitory computer readable storage medium of claim 15, wherein the one or more CVMs is optimized to operate in the cloud infrastructure where it is deployed.

18. The non-transitory computer readable storage medium of claim 15, wherein the one or more tasks of the TMS comprises one or more of packet protocol management, network protocol communication conversions, security operations, load balancing operations, network traffic optimization operations, network firewall operations, or any other traffic management related task.

19. The non-transitory computer readable storage medium of claim 15, wherein the TMS implements a user interface that enables an administrator to manage configuration, deployment, decommissioning, monitoring, and migration of the one or more CVMs.

20. The non-transitory computer readable storage medium of claim 15, further comprising:

employing a remote application programming interface that enables an administrator to manage the TMS's deployment of the one or more CVMs.

21. The non-transitory computer readable storage medium of claim 15, further comprising:

deploying the one or more CVMs based on anticipated usage patterns of the TMS, the anticipated usage patterns comprising at least one of packet traffic flow, a number of maintained connections, resource utilization, a particular task, resource utilization of a particular task, or any other anticipated usage patterns of the TMS.

22. The non-transitory computer readable storage medium of claim 15, wherein the one or more CVMs is initially deployed locally for execution on the TMS prior to being deployed to the cloud infrastructure based on a processing load of the one or more CVMs, the TMS or any other processing resource.

23. The non-transitory computer readable storage medium of claim 15, wherein the TMS deploys the one or more CVMs locally for execution on a local hypervisor prior to or after deploying the one or more CVMs to the cloud infrastructure.

24. The non-transitory computer readable storage medium of claim 15, further comprising:

deploying a plurality of CVMs to form a CVM cluster, wherein the one or more CVMs in the CVM cluster works cooperatively with one or more other CVMs in one or more of the CVM cluster or another CVM cluster to perform one or more portions of the one or more tasks.

25. The non-transitory computer readable storage medium of claim 15, wherein the TMS deploys the CVM based on one or more of deployment policy requirement comprising at least one of task specific, customer specific, server specific, service level specific, permission specific, capacity limits, latency restrictions, security requirements, or any other specific criterion.

26. The non-transitory computer readable storage medium of claim 15, wherein the one or more CVMs performs one or more of policy enforcement operations, policy reference operations, charging operations, data storage operations, server health monitoring operations, network monitoring operations, logging operations, reporting operations, encryption operations, compression operations, or any other network/policy enforcement related operation.

27. The non-transitory computer readable storage medium of claim 15, wherein the one or more CVMs support one or more different cloud infrastructure application program interfaces.

28. The non-transitory computer readable storage medium of claim 15, wherein the TMS load balances the one or more CVMs across one or more cloud infrastructures.

29. A network apparatus for managing communication over a network, comprising:

a transceiver configured to be capable of receiving and transmitting network packets;

a memory that stores computer-executable instructions;

a processor, coupled to the transceiver and the memory, that is configured to be capable of performing actions, including:

employing a traffic management system (TMS) for packet flows over the network, wherein the TMS includes information for deploying one or more component virtual machines (CVM) to a separate cloud infrastructure and locally for execution on the TMS, wherein each deployed CVM is enabled to perform one or more tasks of the TMS;

automatically deploying the one or more CVMs to the separate cloud infrastructure to perform a low security task of the TMS based on one or more of a usage pattern or a CVM deployment policy;

automatically deploying, locally, the one or more CVMs to execute a high security task;

monitoring a periodic heartbeat for each deployed CVM, wherein the heartbeat advertises one or more of being in current communication with the TMS, in current communication with one or more other deployed CVMs, or an ability of a CVM to perform a task; and monitoring usage patterns associated with each deployed CVM to determine a corresponding workload of each deployed CVM.

30. The apparatus of claim 29, further comprising:

dynamically updating deployment of one of the one or more deployed CVMs based on the usage patterns and the corresponding workload of each of the deployed CVMs.

31. The apparatus of claim 29, wherein the one or more CVMs is optimized to operate in the cloud infrastructure where it is deployed.

32. The apparatus of claim 29, wherein the one or more tasks of the TMS comprises one or more of packet protocol management, network protocol communication conversions, security operations, load balancing operations, network traffic optimization operations, network firewall operations, or any other traffic management related task.

33. The apparatus of claim 29, wherein the TMS implements a user interface that enables an administrator to manage configuration, deployment, decommissioning, monitoring, and migration of the one or more CVMs.

34. The apparatus of claim 29, further comprising:

deploying the one or more CVMs based on anticipated usage patterns of the TMS, the anticipated usage patterns comprising at least one of packet traffic flow, a number of maintained connections, resource utilization, a particular task, resource utilization of a particular task, or any other anticipated usage patterns of the TMS.

35. The apparatus of claim 29, wherein the one or more CVMs is initially deployed locally for execution on the TMS prior to being deployed to the cloud infrastructure based on a processing load of the one or more CVMs, the TMS or any other processing resource.

36. The apparatus of claim 29, wherein the TMS deploys the one or more CVMs locally for execution on a local hypervisor prior to or after deploying the one or more CVMs to the cloud infrastructure.

37. The apparatus of claim 29, further comprising:
deploying a plurality of CVMs to form a CVM cluster, wherein the one or more CVMs in the CVM cluster works cooperatively with one or more other CVMs in one or more of the CVM cluster or another CVM cluster to perform one or more portions of the one or more tasks.

38. The apparatus of claim 29, wherein the TMS deploys the CVM based on one or more of deployment policy requirement comprising at least one of task specific, customer specific, server specific, service level specific, permission specific, capacity limits, latency restrictions, security requirements, or any other specific criterion.

39. The apparatus of claim 29, wherein the one or more CVMs performs one or more of policy enforcement operations, policy reference operations, charging operations, data storage operations, server health monitoring operations, network monitoring operations, logging operations, reporting operations, encryption operations, compression operations, or any other network/policy enforcement related operation.

40. The apparatus of claim 29, wherein the one or more CVMs support one or more different cloud infrastructure application program interfaces.

41. The apparatus of claim 29, wherein the TMS load balances the one or more CVMs across one or more cloud infrastructures.

42. A non-transitory computer readable storage medium having stored thereon computer-executable instructions stored thereon, which when executed by one or more processors, causes the one or more processors to implement a component virtual machine (CVM) that is configured to be capable of performing one or more actions to manage communication over a network, comprising:
automatically deploying the CVM to a cloud infrastructure for execution on a traffic management system (TMS) to perform a low security task based on one or more of a usage pattern or a CVM deployment policy;
automatically deploying, locally, the CVM to execute a high security task;
implementing at least one application programming interface (API) to communicate with the TMS utilizing the CVM and the cloud infrastructure hosting the CVM;
automatically performing at least one task of the TMS that the CVM is configured to perform based on one or more of a usage pattern or a CVM deployment policy;
providing usage pattern information associated with the at least one task to the TMS via the API;
monitoring a periodic heartbeat for the CVM, wherein the heartbeat advertises one or more of being in current communication with the TMS, in current communication with one or more other deployed CVMs, or an ability of the CVM to perform a task; and
dynamically updating CVM configuration information based on instructions from the TMS received via the API, the instructions from the TMS being based on the usage pattern information sent by the CVM.

43. A system configured to be capable of performing one or more actions to manage communication over a network, comprising one or more processors, coupled to a transceiver and a memory, wherein the one or more processors are configured to perform actions, including:
providing one or more traffic management systems (TMS);
providing one or more component virtual machine (CVM) that is configured to perform one or more tasks of the TMS, wherein the one or more CVMs is also configured to perform actions, comprising:
being deployed in a separate cloud infrastructure, wherein the one or more CVMs is configured to communicate with the TMS over an application programming interface (API), and
providing usage pattern information associated with the one or more tasks to the TMS via the API; and
the one or more TMSs is configured to perform actions, comprising:
automatically deploying the one or more CVMs to the separate cloud infrastructure to perform a low security task of the TMS based on one or more of a usage pattern or a CVM deployment policy;
automatically deploying, locally, the one or more CVMs to execute a high security task;
monitoring a periodic heartbeat for each deployed CVM, wherein the heartbeat advertises one or more of being in current communication with the TMS, in current communication with one or more other deployed CVMs, or an ability of a CVM to perform a task; and
monitoring usage patterns associated with each deployed CVM to determine a corresponding workload of each deployed CVM.

\* \* \* \* \*